United States Patent
Pichon et al.

(10) Patent No.: US 11,072,766 B2
(45) Date of Patent: *Jul. 27, 2021

(54) PROCESS FOR PREPARING POLYUREA MICROCAPSULES

(71) Applicant: FIRMENICH SA, Geneva (CH)

(72) Inventors: Nicolas Pichon, Geneva (CH); Sonia Godefroy, Geneva (CH); Arnaud Struillou, Geneva (CH)

(73) Assignee: Firmenich SA, Satigny (CH)

( * ) Notice: Subject to any disclaimer, the term of this patent is extended or adjusted under 35 U.S.C. 154(b) by 255 days.

This patent is subject to a terminal disclaimer.

(21) Appl. No.: 14/367,909

(22) PCT Filed: Dec. 13, 2012

(86) PCT No.: PCT/EP2012/075393
§ 371 (c)(1),
(2) Date: Jun. 21, 2014

(87) PCT Pub. No.: WO2013/092375
PCT Pub. Date: Jun. 27, 2013

(65) Prior Publication Data
US 2014/0378367 A1    Dec. 25, 2014

(30) Foreign Application Priority Data

Dec. 22, 2011 (EP) ..................... 11195110

(51) Int. Cl.
| | | |
|---|---|---|
| *C11D 3/50* | (2006.01) | |
| *B01J 13/14* | (2006.01) | |
| *B05D 1/18* | (2006.01) | |
| *C11B 9/00* | (2006.01) | |
| *C11D 3/00* | (2006.01) | |

(52) U.S. Cl.
CPC ............. *C11D 3/505* (2013.01); *B01J 13/14* (2013.01); *B05D 1/18* (2013.01); *C11B 9/00* (2013.01); *C11D 3/001* (2013.01)

(58) Field of Classification Search
CPC ........... C11D 3/50; C11D 3/505; C11D 3/001; B05D 1/18; C11B 9/00; B01J 13/14
USPC .................. 510/337, 515; 512/4; 427/213.32
See application file for complete search history.

(56) References Cited

U.S. PATENT DOCUMENTS

| | | | | |
|---|---|---|---|---|
| 4,043,963 A * | 8/1977 | Anderson | ............ | C08G 12/422 428/418 |
| 4,353,809 A | 10/1982 | Hoshi et al. | | |
| 4,404,296 A * | 9/1983 | Schapel | ................ | A01N 25/10 523/105 |
| 4,610,927 A | 9/1986 | Igarashi et al. | | |
| 4,824,823 A * | 4/1989 | Pietsch | ..................... | B01J 13/18 264/4.7 |
| 4,965,025 A * | 10/1990 | Pietsch | ..................... | B01J 13/18 264/4.7 |
| 5,089,339 A * | 2/1992 | Pietsch | ..................... | B01J 13/18 264/4.7 |
| 6,261,483 B1 * | 7/2001 | Frank | ....................... | B01J 13/18 264/4.1 |
| 7,799,752 B2 * | 9/2010 | Ness | ........................ | A61K 8/11 512/4 |
| 10,124,309 B2 * | 11/2018 | Struillou | ............... | C11B 9/0019 |
| 10,526,567 B2 * | 1/2020 | Struillou | ............... | A61K 8/022 |
| 2005/0112152 A1 | 5/2005 | Popplewell et al. | | |
| 2005/0113267 A1 * | 5/2005 | Popplewell | ............. | A61Q 13/00 510/101 |
| 2005/0153135 A1 | 7/2005 | Popplewell et al. | | |
| 2007/0202063 A1 * | 8/2007 | Dihora | ..................... | A61K 8/11 424/70.1 |

FOREIGN PATENT DOCUMENTS

| | | |
|---|---|---|
| EP | 1894603 A1 | 3/2008 |
| EP | 1741775 B1 | 4/2009 |
| GB | 2432843 A | 6/2007 |
| GB | 2432850 A | 6/2007 |
| GB | 2432851 A | 6/2007 |
| GB | 2432852 A | 6/2007 |
| JP | S6064627 A | 4/1985 |
| WO | WO2004016234 A1 | 2/2004 |
| WO | WO2005054422 A1 | 6/2005 |
| WO | WO2007062733 A1 | 6/2007 |
| WO | WO2007062833 A1 | 6/2007 |
| WO | WO2008016684 A1 | 2/2008 |
| WO | WO2008098387 A1 | 8/2008 |
| WO | WO 2010053940 A1 * | 5/2010 ............. B01J 13/16 |

OTHER PUBLICATIONS

Wikipedia, ethyl salicylate, 2015 p. 1.*
Moghbeli et al. Iranian Journal of Chemical Engineering vol. 8, No. 4 (Autumn), 2011 IAChe. pp. 34-42.*
Urea-Formaldehyde properties, "Polymer Properties" MSDS pp. 2, 2019.*
International Search Report + Written opinion, application PCT/EP2102/075393, filed on Jan. 11, 2013.
Bonatz et al., Acta Polymerica 40 (1989) pp. 683-690.
Dietrich et al., Acta Polymerica 40 (1989) pp. 243-251.
Dietrich et al., Acta Polymerica 40 (1989) pp. 325-331.
Dietrich et al., Acta Polymerica 41 (1990) pp. 91-95.
Lee et al., J. Microencapsulation 19 (2002), 5, 559-569.

* cited by examiner

*Primary Examiner* — Gregory R Delcotto
*Assistant Examiner* — Preeti Kumar
(74) *Attorney, Agent, or Firm* — Armstrong Teasdale LLP

(57) ABSTRACT

The present invention relates to a one-shell aminoplast core-shell microcapsule stabilized by a polyisocyanate. It also provides a method for stabilizing aminoplast microcapsules in liquid aqueous surfactant-rich consumer products.

28 Claims, No Drawings

PROCESS FOR PREPARING POLYUREA MICROCAPSULES

TECHNICAL FIELD

The present invention relates to aminoplast microcapsules stabilized by a polyisocyanate and liquid aqueous surfactant-rich consumer products comprising said capsules. It also provides a method for stabilizing aminoplast microcapsules in liquid aqueous surfactant-rich consumer products.

BACKGROUND OF THE INVENTION AND PROBLEM TO BE SOLVED

One of the problems faced by the perfumery industry lies in the relatively rapid loss of the olfactive benefit provided by odoriferous compounds due to their volatility, particularly that of "top-notes". This problem is generally tackled using a delivery system, e.g. capsules containing a perfume, to release the fragrance in a controlled manner. Aminoplast microcapsules formed of a melamine-formaldehyde resin are frequently used to encapsulate hydrophobic actives, thus protecting said actives and providing their controlled release.

However, capsules such as aminoplast ones suffer from stability problems when used in consumer products comprising surfactants, such as perfumery consumer products, especially after prolonged storage at elevated temperatures. In such products, the encapsulated active tends to leak out of the capsule, even though the capsule wall remains intact, by diffusion through the wall due to the presence of surfactants that are able to solubilise the encapsulated active in the product base. The leakage phenomenon reduces the efficiency of the capsules to protect the active and provide its controlled release. This is especially disadvantageous when the active is a volatile ingredient such as a perfume.

Diverse technologies have been developed to improve stability of aminoplast capsules in perfumery consumer products. In one approach, the composition of the encapsulated material is specifically designed to avoid leakage (see for example US 2005/0112152, EP 1894603 and US 2005/0153135). The disadvantage of this solution is that it imposes restriction regarding the active to be encapsulated, thus reducing the perfumer's freedom to create perfumes based on its organoleptic characteristics.

Alternatively, some prior art documents disclose coating of the capsules (see WO 2004/016234) with an additional layer or shell (two shells systems). The disadvantage of such approach is that during the manufacture additional steps are required, when compared to the classical method of preparation of aminoplast capsules, causing additional chemical steps & costs.

Thus, prior art methods for reducing leakage of the perfume out of the capsules when incorporated in consumer products comprising surfactants often have the drawback of reducing the olfactive performance of the capsules.

It would therefore be of particular interest to provide a method for improving the stability of aminoplast capsules, for examples in applications such as liquid aqueous surfactant-containing consumer products such as perfumed products. It would be even more advantageous to provide capsules which have good stability in surfactant-containing to products and at the same time have good olfactive performance. The capsules should therefore be at the right balance between retention of the perfume during storage and suitable release of the perfume upon use of the product. The present invention addresses these problems. Furthermore, it would be even preferable to provide a solution to these problems which neither involves high temperatures and very acidic conditions during the encapsulation process, nor require additional processing steps after encapsulation takes place.

No prior art document describes stabilization of aminoplast capsules by using an additive that is combined with the active to be encapsulated before encapsulation takes place. In particular, the use of a polyisocyanate as such an additive is never mentioned or even suggested in the prior art.

U.S. Pat. No. 4,353,809 discloses combination of an aminoplast resin with a polyisocyanate compound to form microcapsules. However this document relates to the totally different technical field of applying capsules to paper. The capsules are therefore used in dry conditions or in organic solvents rather than in liquid aqueous surfactant-based consumer products. It is well known to the person skilled in the art of encapsulation that capsules stability is totally different when used in dry conditions, in an organic solvent or in an aqueous surfactant-containing medium. In addition, olfactive performance of capsules is not at all mentioned in this prior art document. Therefore, this document is of no help to solve the problems addressed by the present invention.

DETAILED DESCRIPTION OF THE INVENTION

In order to solve the above mentioned problems, the present invention relates to a one-shell, or one-wall, aminoplast core-shell microcapsule obtainable by a process comprising the steps of:

1) admixing a perfume oil with at least a polyisocyanate having at least two isocyanate functional groups to form an oil phase
2) dispersing or dissolving into water an aminoplast resin and optionally a stabilizer to form a water phase;
3) preparing an oil-in-water dispersion, wherein the mean droplet size is comprised between 1 and 100 μm, by admixing the oil phase and the water phase;
4) performing a curing step to form the wall of said microcapsule; and
5) optionally drying the final dispersion to obtain the dried core-shell microcapsule.

For the sake of clarity, by the wording "one-shell, or one-wall" it is meant here that said microcapsule do have a wall which is not coated, nor internally or externally, by a different material or a film-forming polymers. In any case the invention's capsules are devoid of polysiloxane and/or PVP (polyvinyl pirrolidone) and its co-copolymers. Said microcapsules may have material deposited on its surface, such as colloidal stabilisers or a cationic polymer, but in amount in any case insufficient to form a continuous phase, film, wall, coating made of another polymers or resin.

For the sake of clarity, by the expression "core-shell microcapsule", or the similar, in the present invention it is meant that the capsule has a size in the micron range (e.g. a mean diameter comprised between about 1 and 100 μm) and comprises an external solid oligomers-based shell or wall and an internal continuous oil phase enclosed by the external shell. In other words bodies like coacervates or extrudates (i.e. porous solid phases containing droplets of a liquid) are not part of the invention. According to an embodiment of the invention, the size of said microcapsules, and consequently of the droplet size in step 1), is comprised between about 5 and 50 μm, or even between about 5 and 25 μm.

For the sake of clarity, by the expression "dispersion", in the present invention it is meant a system in which particles are dispersed in a continuous phase of a different composition and specifically includes a suspension or an emulsion.

By "perfume oil" (or also "perfume") we mean here a perfume that is a liquid at about 20° C. and which will be in the core of the core-shell capsules. According to any one of the above embodiments said perfume oil in which the polyisocyanate is dissolved in step 1) can be a perfuming ingredient alone or a mixture of ingredients in the form of a perfuming composition. As a "perfuming ingredient" it is meant here a compound, which is used in perfuming preparation or composition to impart a hedonic effect. In other words such an ingredient, to be considered as being a perfuming one, must be recognized by a person skilled in the art as being able to impart or modify in a positive or pleasant way the odor of a composition, and not just as having an odor. For the purpose of the present invention, malodor counteracting ingredients are also encompassed by the definition of "perfuming ingredient".

The nature and type of the perfuming ingredients present in the base do not warrant a more detailed description here, which in any case would not be exhaustive, the skilled person being able to select them on the basis of its general knowledge and according to intended use or application and the desired organoleptic effect. In general terms, these perfuming ingredients belong to chemical classes as varied as alcohols, aldehydes, ketones, esters, ethers, acetates, nitriles, terpenoids, nitrogenous or sulphurous heterocyclic compounds and essential oils, and said perfuming co-ingredients can be of natural or synthetic origin. Many of these co-ingredients are in any case listed in reference texts such as the book by S. Arctander, Perfume and Flavor Chemicals, 1969, Montclair, N.J., USA, or its more recent versions, or in other works of a similar nature, as well as in the abundant patent literature in the field of perfumery. It is also understood that said ingredients may also be compounds known to release in a controlled manner various types of perfuming compounds.

The perfuming ingredients may be dissolved in a solvent of current use in the perfume industry. The solvent is preferably not an alcohol. Examples of such solvents are diethyl phthalate, isopropyl myristate, Abalyn® (rosin resins, available from Eastman), benzyl benzoate, ethyl citrate, limonene or other terpenes, or isoparaffins. Preferably, the solvent is very hydrophobic and highly sterically hindered, like for example Abalyn®. Preferably the perfume comprises less than 30% of solvent. More preferably the perfume comprises less than 20% and even more preferably less than 10% of solvent, all these percentages being defined by weight relative to the total weight of the perfume. Most preferably, the perfume is essentially free of solvent.

According to a particular embodiment of the invention, the perfume contains less than 10% of its own weight of primary alcohols, less than 15% of its own weight of secondary alcohols and less than 20% of its own weight of tertiary alcohols. Preferably, the perfume does not contain any primary alcohols and contains less than 15% of secondary and tertiary alcohols. Such limited amounts of alcohols have the advantage of reducing the amount of isocyanate functional groups reacting with the perfume.

According to any one of the invention's embodiment, the perfume oil represents between about 10% and 60% w/w, or even between 20% and 45% w/w, by weight, relative to the total weight of the dispersion as obtained after step 3).

Oil phase of step 1) comprises also at least a polyisocyanate each having at least two isocyanate functional groups.

For the purpose of the present invention, each polyisocyanate comprises at least two isocyanate functional groups. Said polyisocyanate may comprise up to 6, or even only 4, isocyanate functional groups. According to any of the above embodiment, said polyisocyanate contains at least three isocyanate functional groups. Following these numbers of functional groups, optimal reaction of the polyisocyanate with the aminoplast resin is achieved, a higher number of isocyanate group per polyisocyanate compound leading to increased cross-linking.

Low volatility polyisocyanates are preferred because of their low toxicity.

The polyisocyanate may be aliphatic, aromatic or a mixture of both aromatic and aliphatic polyisocyanates. In the case of mixtures of polyisocyanates, each member of the mixture has at least two isocyanate functional groups.

According to any one of the invention's embodiment, said polyisocyanate is an aromatic polyisocyanate.

The term "aromatic polyisocyanate" is meant here as encompassing any polyisocyanate comprising an aromatic moiety. Preferably, it comprises a phenyl, a toluyl, a xylyl, a naphthyl or a diphenyl moiety, more preferably a toluyl or a xylyl moiety. Preferred aromatic polyisocyanates are biurets and polyisocyanurates, more preferably comprising one of the above-cited specific aromatic moieties. More preferably, the aromatic polyisocyanate is a polyisocyanurate of toluene diisocyanate (commercially available from Bayer under the tradename Desmodur® RC), a trimethylol propane-adduct of toluene diisocyanate (commercially available from Bayer under the tradename Desmodur® L75), a trimethylol propane-adduct of xylylene diisocyanate (commercially available from Mitsui Chemicals under the tradename Takenate® D-110N). In a most preferred embodiment, the aromatic polyisocyanate is a trimethylol propane-adduct of xylylene diisocyanate.

According to any one of the invention's embodiment, said polyisocyanate is an aliphatic polyisocyanate.

The term "aliphatic polyisocyanate" is defined as a polyisocyanate which does not comprise any aromatic moiety. Preferred aliphatic polyisocyanates are a trimer of hexamethylene diisocyanate, a trimer of isophorone diisocyanate, a trimethylol propane-adduct of hexamethylene diisocyanate (available from Mitsui Chemicals) or a biuret of to hexamethylene diisocyanate (commercially available from Bayer under the tradename Desmodur® N 100), among which a biuret of hexamethylene diisocyanate is even more preferred.

According to any one of the invention's embodiment, said at least one polyisocyanate is in the form of a mixture of at least one aliphatic polyisocyanate and of at least one aromatic polyisocyanate, both comprising at least two or three isocyanate functional groups, such as a mixture of a biuret of hexamethylene diisocyanate with a trimethylol propane-adduct of xylylene diisocyanate, a mixture of a biuret of hexamethylene diisocyanate with a polyisocyanurate of toluene diisocyanate and a mixture of a biuret of hexamethylene diisocyanate with a trimethylol propane-adduct of toluene diisocyanate. Most preferably, it is a mixture of a biuret of hexamethylene diisocyanate with a trimethylol propane-adduct of xylylene diisocyanate.

In a preferred embodiment, the at least one aliphatic polyisocyanate and the at least one aromatic polyisocyanate are used in a respective molar ratio comprised between 80:20 and 10:90, preferably between 75:25 and 20:80, more preferably between 60:40 and 20:80, even more preferably between 60:40 and 30:70, most preferably between 45:55 and 30:70.

Preferably the polyisocyanate is added in an amount comprised between 0.01% and 20% w/w, more preferably between 0.1% and 10% w/w, most preferably between 0.5% and 5% w/w by weight, relative to the total weight of the perfume oil.

In step 2), for the formation of the water phase requires an aminoplast resin. Such aminoplast resins are the reaction products of the polycondensation of one or more amine with one or more aldehyde, preferably formaldehyde. Examples of suitable amines include urea, melamine and its derivatives. Preferably, the aminoplast resin is selected from melamine-formaldehyde and urea-formaldehyde condensates and most preferably from melamine-formaldehyde condensates. Such melamine-formaldehyde and urea-formaldehyde condensates are well-known to the person skilled in the art of encapsulation and are described in details in the abundant available literature disclosing such condensates. Diverse materials and process steps are suitable for the formation of such capsules. Such encapsulating polymers therefore do not warrant a detailed description here, which would in any case not be exhaustive.

In a preferred embodiment, the aminoplast resin is added in amounts ranging from about 0.5% and 15% w/w, or even between 1.0% and 10% w/w, by weight relative to the total weight of the dispersion as obtained after step 3).

Suitable methods for forming aminoplast resins and microcapsules are for example described in details in Dietrich K., Bonatz E., Nastke H., Herma H., Walter M. and Teige W.; Acta Polymerica 41 (1990), pp. 91-95, in Bonatz E., Dietrich K., Herma, H., Walter M. and Teige W.; Acta polymerica 40 (1989), pp. 683-690, in Dietrich K., Bonatz E., Geistlinger H., Herma H., Nastke R., Purz H.-J., Schlawne M. and Teige W.; Acta Polymerica 40 (1989), pp. 325-331, in Dietrich K., Herma H., Nastke R., Bonatz E. and Teige W.; Acta Polymerica 40 (1989), pp. 243-251, in Lee H. Y., Lee S. J., Cheong I. W. and Kim J. H.; J. Microencapsulation 19 (2002), pp. 559-569. U.S. Pat. No. 4,353,809 also discloses the fundamental steps and details of aminoplast capsules formation. This method can be applied in the present invention (i.e. the action required to perform step 4).

The water phase may also optionally comprise a stabilizer. According to any one of the above embodiments of the present invention, the dispersion comprises between about 0% and 5% w/w of at least a stabilizer, percentage being expressed on a w/w basis relative to the total weight of the dispersion as obtained after step 3). In still another aspect of the invention, the dispersion comprises between about 0% and 2% w/w of at least a stabilizer. In still another aspect of the invention, the dispersion comprises between about 0% and 1% w/w of at least a stabilizer.

For the sake of clarity, in the present context, by the expression "stabilizer", or the similar, it is meant the normal meaning understood by a person skilled in the art, i.e. a compound that is capable, or is added to, stabilize the system, e.g. to prevent aggregation or agglomeration of the microcapsules, for example in the application or during their preparation. The use of said stabilizer is standard knowledge of the person skilled in the art.

For the purpose of the present invention, said stabilizer can be an ionic or non-ionic surfactant or a colloidal stabilizer. The exact nature of such stabilizers is well known by a person skilled in the art. As non limiting examples, one may cite the followings stabilizers: non-ionic polymers such as cellulose derivatives such hydroxyethyl cellulose, polyethylene oxide, co-polymers of polyethylene oxide and polyethylene or polypropylene oxide, co-polymers alkyl acrylates and N-vinylpyrrolidone; ionic polymers such as co-polymers of acrylamide and acrylic acid (such as Alcapsol® 144 from Ciba), e.g. acid/acrylamide copolymers produced from monomer mixture of acrylic acid and acrylamide wherein the acrylic acid content is in the range of from 30 to to 70%, acid anionic surfactant (such as sodium dodecyl sulfate), acrylic co-polymers bearing a sulfonate group (such as sodium poly(styrene sulfonate), and co-polymers of vinyl ethers and maleic anhydride.

According to any one of the above embodiments of the present invention, said stabilizer is an ionic surfactant, such as a co-polymers of acrylamide and acrylic acid.

Step 3) is an admixing step, which is well known and a person skilled in the art knows how to perform it. However it is worth mentioning that according to any one of the invention's embodiments, in said step the pH of said water phase can be adjusted typically, and non-limiting, between about 4 and 7, preferably between 4.5 and 6.

In step 4) the microcapsules of the invention are formed. Means to perform such step are also well known and a person skilled in the art knows how to perform it. By way of examples, and non-limiting, one can perform the curing by warming up the dispersion at about 60° to 95° C., up to the completion of the wall formation. Then step 4) is completed by cooling the obtained dispersion to room temperature. The resulting product obtained after step 4) is called a slurry.

According to a particular embodiment of the invention, at the end of step 4) one may also add to the invention's slurry some cationic polymers. Said cationic polymers are well known to a person skilled in the art, e.g. are described in WO 08/098387 page 5, lines 10 to 30.

Preferred cationic polymers will have cationic charge densities of at least 0.5 meq/g, more preferably at least about 1.5 meq/g, but also preferably less than about 7 meq/g, more preferably less than about 6.2 meq/g. The cationic charge density of the cationic polymers may be determined by the Kjeldahl method as described in the US Pharmacopoeia under chemical tests for Nitrogen determination.

The preferred cationic polymers are chosen from those that contain units comprising primary, secondary, tertiary and/or quaternary amine groups that can either form part of the main polymer chain or can be borne by a side substituent directly connected thereto. The weight average (Mw) molecular weight of the cationic polymer is preferably between 10,000 and 2M Dalton, more preferably between 50,000 and 1.5M Dalton. As specific examples, one may cite Salcare® SC60 (cationic copolymer of acrylamidopropyltrimonium chloride and acrylamide, origin: BASF) or Luviquat®, such as the PQ 11N, FC 550 or Supreme (polyquaternium-11 to 68 or quaternized copolymers of vinylpyrrolidone origin: BASF), or also the Jaguar® (C135 or C17, origin Rhodia).

According to any one of the above embodiments of the invention, there is added an amount of cationic polymers comprised between about 0% and 10% w/w, or even between about 1% and 5% w/w, percentage being expressed on a w/w basis relative to the total weight of the slurry as obtained after step 4). It is clearly understood by a person skilled in the art that only part of said added cationic polymers will be incorporated into/deposited on the microcapsule shell.

According to a particular embodiment of the invention, at the end of step 4) one may optionally add to the slurry, just before or after the cooling to room temperature compounds which are known to be scavengers of residuals free aldehydes such as formaldehyde. Such compounds are well known in the art and can for example be urea or ethylene urea.

Said aqueous slurry obtained at the end of step 4) can be used directly as perfuming ingredient, in particular for applications which are aqueous based, e.g. a softener or a liquid soap. Therefore another object of the present invention is an aqueous slurry comprising the invention's microcapsules, for example a slurry as obtained directly for the process of preparation of the microcapsules. Said slurry may further comprise some formulation aids, such as stabilizer or viscosity control agents, or even biocides or bactericides.

Alternatively, in the optional step 5), the slurry obtained by the process described above can be submitted to a drying, like spay drying, to provide the microcapsules as such, i.e. in a powdery form. It is understood that any standard method known by a person skilled in the art to perform such drying is also applicable.

The present invention relates also to a liquid perfumed consumer product comprising:
  a) from 2 to 65% by weight, relative to the total weight of the consumer product, of at least one surfactant;
  b) water; and
  c) the above aminoplast microcapsules.

The above aminoplast microcapsules can also be described as being obtained by a process comprising the steps of:
  i. preparing an oil phase by admixing at least one polyisocyanate having at least two isocyanate functional groups with a perfume; and
  ii. encapsulating the oil phase obtained in step a) in an aminoplast resin.

The microcapsules as obtained after step 4), or the slurry as obtained after step 5), can for example be incorporated in the consumer product in an amount of from 0.01 to 10% w/w, more preferably from 0.05 to 2% w/w, most preferably from 0.1 to 1% w/w, these percentages being defined by weight relative to the total weight of the consumer product. Of course the above concentrations may be adapted according to the olfactive effect desired in each product.

The consumer product may be in the form of a home- or personal-care product or in the form of an aqueous fine fragrance product. Examples of personal-care products include a shampoo, a leave-on or rinse-off hair conditioner, a body wash such as shower or bath, gel oil or mousse, an hygiene product, a body or hair spray, a cosmetic preparation, a body lotion, a deodorant or an antiperspirant, such as a roll-on deodorant or antiperspirant. Examples of aqueous fine fragrance products include a perfume, an after-shave lotion or a cologne. Examples of home-care products include a liquid detergent, an all-purpose cleaner, a fabric softener or refresher, an ironing water, a detergent, softener or drier sheet. As detergents we include here products such as detergent compositions or cleaning products for washing up or for cleaning various surfaces, for example intended for the treatment of textiles or hard surfaces (floors, tiles, stone-floors, etc). Preferably the surface is a textile.

Formulations of consumer product bases can be found in the abundant literature relative to such products. These formulations do not warrant a detailed description here, which would in any case not be exhaustive. The person skilled in the art of formulating such consumer products is perfectly able to select the suitable components on the basis of his general knowledge and of the available literature. In particular, examples of such formulations can be found in the patents and patent applications relative to such products, for example in WO 2008/016684 (pages 10 to 14), in US 2007/0202063 (paragraphs [0044] to [0099]), in WO 2007/062833 (pages 26 to 44), in WO 2007/062733 (pages 22 to 40), in WO 2005/054422 (pages 4 to 9), in EP 1741775, in GB 2432843, in GB 2432850, in GB 2432851 or in GB 2432852.

The desired stability is obtained in consumer products comprising diverse types of surfactants, including cationic, anionic, non-ionic, zwitterionic and semi-polar nonionic surfactants, in amounts ranging up to 65% by weight, more preferably between 2 and 50% by weight, relative to the total weight of the consumer product. For the purpose of the present invention, surfactants are preferably intended as those commonly used in consumer good products. Those are well known to the person skilled in the art and do not warrant a more detailed description. Non-exhautive examples of such surfactants comprise sodium alkylbenzene sulfonate, sodium alkyl sulfate, sodium alkyl ether sulfate and fatty acid salts for anionic surfactants; ethoxylated alcohols, alkyl N-methyl glucamide and alkyl polyglucoside for non-ionic surfactants; quaternary ammonium salts such as chloride or methylsulfate of alkyltrimethylammonium, di-(tallow-oxyethyl)dimethylammonium, ditallowdimethyl ammonium for cationic surfactants; alkyl betaines, alkylamido betaines, amine oxides for amphoteric and zwitterionic surfactants. For the purpose of the present invention, surfactants are preferably intended as excluding polymeric stabilizing emulsifiers such as acrylic copolymers and gum Arabic, which are typically used to stabilize emulsions in encapsulation processes.

In a preferred embodiment of the invention, the capsules are stable in the liquid aqueous perfumed consumer product so that less than 60% of the initial perfume load leaks out of the capsules when they are stored in such a product. The storage time and temperature at which such stability is preferably reached depends on the consumer product type. Preferably, such stability results are reached after 2 or even after 4 weeks storage at 43° C., for products such as liquid detergents and fabric softeners.

In another embodiment, the present invention provides a method for stabilizing aminoplast microcapsules in a liquid consumer product comprising water and from 2 to 65% by weight of surfactant, relative to the consumer product, comprising admixing a polyisocyanate to the perfume to be encapsulated to form an oil phase prior to the encapsulation process.

EXAMPLES

The following examples are further illustrative of the present invention's embodiments, and further demonstrate the advantages of the invention's capsules relative to prior art teachings.

Example 1

Preparation of Aminoplast Microcapsules for use in the Invention

Aminoplast microcapsules for use in the invention (Capsules B) were prepared having the following ingredients:

TABLE 1

Composition of Capsules B

| Ingredient | Amount [%] |
|---|---|
| Oil Phase | 30.9 |
| Perfume oil | |
| Takenate ® D-110N | |
| Water phase | |
| acrylamide and acrylic acid copolymer[1] | 4.7 |
| Melamine-formaldehyde resin[2] | 4.7 |
| Water | 48.3 |
| Sodium hydroxyde | 0.5 |
| Acetic acid | 0.2 |
| Salcare SC60[3] | 10.7 |
| Total | 100.0 |

[1] Alcapsol from Ciba, 20% solution in water
[2] Cymel 385 from Cytec, 70% solution in water
[3] Salcare SC60 from Ciba, 3% solution in water The oil phase was prepared by admixing a polyisocyanate (trimethylol propane adduct of xylylene diisocyanate, Takenate® D-110N, origin: Mitsui Chemicals) with a perfume oil comprising the ingredients listed in Table 2. The oil phase consisting of 0,1% Takenate® D-110N and 99.9% of the perfume oil.

TABLE 2

Composition of the perfuming composition

| Ingredient | Amount [%] |
|---|---|
| Ethyl 2-methyl-pentanoate[1] | 1.7 |
| Eucalyptol | 25.9 |
| 2,4-Dimethyl-3-cyclohexene-1-carbaldehyde[1] | 0.8 |
| Decanal | 2.2 |
| Citronellyl nitrile | 7.9 |
| Isobornyl acetate | 9.3 |
| Verdox ®[2] | 18.7 |
| Citronellyl acetate | 0.3 |
| 2-methylundecanal | 1.3 |
| Diphenyloxide | 0.7 |
| Dodecanal | 0.1 |
| Mixture of tricyclo[5.2.1.0(2,6)]dec-3-en-8-yl acetate and tricyclo[5.2.1.0(2,6)]dec-4-en-8-yl acetate[1] | 5.1 |
| Beta-ionone | 3.8 |
| Gamma-undecalactone | 8.1 |
| Hexyl salicylate | 7.1 |
| Benzyl salicylate | 7.0 |
| Total | 100.0 |

[1] Origin: Firmenich SA, Geneva, Switzerland
[2] 2-Tert-butyl-1-cyclohexyl acetate, origin: International Flavors & Fragrances, USA To make the capsules slurry, the acrylamide and acrylic acid copolymer and the to melamine-formaldehyde resin were dissolved in water to form the water phase. Then the perfume premix oil was added into this solution and the pH was regulated to 5 with acetic acid. The temperature was raised to 90° C. for 2 hours to allow the curing of the capsules. At this point, capsules are formed, cross-linked and stable. A 3% Salcare solution in water was then added into the mixture at 90° C. and was allowed to react for 1 hour at 90° C. Then a solution of ethylene urea (containing about 3% w/w of ethylene urea relative to the weight of the slurry) was added as usually done with aminoplast capsules as an agent to scavenge residual free formaldehyde and the mixture was left to cool down to room temperature. The final pH was adjusted to 7 with sodium hydroxide.

Further capsules (Capsules C to E) were prepared according to the above protocol, except that the amounts of Takenate® D-110N and perfume varied as indicated in the table below.

TABLE 3

Amount of polyisocyanate and perfume in the oil phase used to prepare Capsules C to E

| | Takenate ® D-110N[1] [%] | % wt Perfume oil[2] [%] |
|---|---|---|
| Capsules C | 0.5 | 99.5 |
| Capsules D | 1 | 99 |
| Capsules E | 4 | 96 |

[1] Trimethylol propane-adduct of xylylene diisocyanate (origin: Mitsui Chemicals)
[2] Perfuming composition having the ingredients of Table 2

Example 2

Preparation of Aminoplast Microcapsules for use in the Invention

Capsules F to H were prepared using the method described in Example 1, except that, in the oil phase, Takenate® D-110N was replaced by the aliphatic polyisocyanate Desmodur® N 100 (Biuret of hexamethylene diisocyanate (origin Bayer)). The respective amounts of polyisocyanate and perfume oil in the oil phase used in Capsules F to H are summarized in the table below.

TABLE 4

Amounts of polyisocyanate and perfume oil in the oil phase in Capsules F to H

| | Desmodur ® N 100[1] [%] | Perfume oil[2] [%] |
|---|---|---|
| Capsules F | 0.5 | 99.5 |
| Capsules G | 1 | 99 |
| Capsules H | 4 | 96 |

[1] Biuret of hexamethylene diisocyanate (origin Bayer)
[2] Perfuming composition having the ingredients of Table 2

Example 3

Preparation of Aminoplast Microcapsules for use in the Invention

Capsules I to K were prepared using the method described in Example 1, except that, in the oil phase, Takenate® D-110N was replaced by a wt % 50/50 mix of the aromatic polyisocyanate Takenate® D-110N and aliphatic polyisocyanate Desmodur® N 100. The respective amounts of polyisocyanates and perfume oil in the oil phase used in Capsules I to K are summarized in the table below.

TABLE 5

Amount of polyisocyanates and perfume oil in the perfume premix oil used in Capsules I to K

| | Desmodur® N 100[1] [%] | Takenate® D-110N[2] [%] | Perfume oil[3] [%] |
|---|---|---|---|
| Capsules I | 0.25 | 0.25 | 99.5 |
| Capsules J | 0.5 | 0.5 | 99 |
| Capsules K | 2 | 2 | 96 |

[1] Biuret of hexamethylene diisocyanate (origin Bayer)
[2] Trimethylol propane-adduct of xylylene diisocyanate (origin: Mitsui Chemicals)
[3] Perfuming composition having the ingredients of Table 2

Example 4 (Comparative)

Preparation of Aminoplast Microcapsules without Polyisocyanate

Control Capsules A were prepared using the method described in Example 1, except that no polyisocyanate was added. The perfuming composition as such was thus used in place of the oil phase.

Example 5

Average Diameter of the Capsules of the Invention

The size distribution of Control Capsules A and of Capsules B to K was controlled by Optical Microscopy and Light Scattering (Mastersizer S, Malvern) and the average diameter was calculated (arithmetic mean) for each type of capsules. The results are summarized in the following table.

TABLE 6

Average diameter of Capsules A to K

| Capsules | Average diameter d(v, 0.5) [μm] |
|---|---|
| Control Capsules A | 15 |
| Capsules B | 15 |
| Capsules C | 15 |
| Capsules D | 18 |
| Capsules E | 12 |
| Capsules F | 15 |
| Capsules G | 15 |
| Capsules H | 14 |
| Capsules I | 15 |
| Capsules J | 16 |
| Capsules K | 17 |

Example 6

Preparation of a Fabric softener of the Invention

A concentrated unperfumed fabric softener base was prepared by admixing the ingredients listed in Table 7, in the amounts indicated. The percentages are defined by weight relative to the total weight of the unperfumed fabric softener base.

TABLE 7

Formulation of the concentrated unperfumed fabric softener base (pH ~2.85)

| Ingredient | % |
|---|---|
| Stepantex VL90 A Diester Quat[1] | 16.50 |
| Proxel GXL[2] | 0.04 |
| $CaCl_2$ (10% aqueous solution) | 0.20 |
| Water | 83.26 |

[1] Origin: Stepan
[2] Origin: Avecia

Softeners B to K were prepared by adding Capsules B to K at 0.45% by weight, relative to the total weight of the softener into the unperfumed softener base of Table 7 under gentle shaking.

Preparation of a Fabric-Softener Comprising Control Capsules A:

Control Softener A was prepared by adding Control Capsules A at 0.45% by weight, relative to the total weight of the softener into the unperfumed softener base of Table 7 under gentle shaking.

Stability of the Aminoplast Microcapsules in the Fabric Softener of the Invention The storage stability of the capsules in Control Softener A and in Softeners B to K was evaluated. The softeners were stored for up to one month at 43° C. or two weeks at 50° C. The amount of perfume having leaked out of the capsules was then measured by solvent extraction and GC-MS analysis. The results are summarized in the following table.

TABLE 8

Storage stability of the capsules in Softeners B to K and in Control Softener A

| | Amount of perfume that leaked out of the capsules [%] | | |
|---|---|---|---|
| Fabric softener | After 2 weeks at 43° C. | After 4 weeks at 43° C. | After 2 weeks at 50° C. |
| Control Softener A | 30 | 68 | 87 |
| Softener B | 15 | 46 | 63 |
| Softener C | 7 | 25 | 44 |
| Softener D | 5 | 20 | 40 |
| Softener E | 4 | 12 | 25 |
| Softener F | N/A | 56 | N/A |
| Softener G | N/A | 50 | N/A |
| Softener H | N/A | 34 | N/A |
| Softener I | N/A | 40 | N/A |
| Softener J | N/A | 20 | N/A |
| Softener K | N/A | 18 | N/A |

It is apparent from these results that each of Capsules B to K of the present invention was more stable in the softener base than the corresponding Control Capsules A, since less perfume leaked out of the capsules after the storage period. This shows that adding a polyisocyanate to the perfume before the encapsulation takes place improves the storage stability of the aminoplast microcapsules in a fabric softener base Improvement in stability is evident even after adding only small quantities of these additives (from 0.1% by weight, based on the perfume premix oil). Even better results are achieved when the isocyanate is used in an amount of at least 0.5% or even of at least 1%.

Olfactive Performance of the Aminoplast Microcapsules in the Fabric Softener of the Invention The olfactive performance of Control Capsules A and of Capsules B to K was evaluated in Control Softener A and in Softeners B to K, both fresh and after storage for up to 4 weeks at 43° C.

Cotton terry towels (20 pieces, 18 cm*18 cm, about 30 g each) were washed with 30 g of unperfumed detergent in a washing machine (Miele Novotronic W300-33CH) at 40° C. using the short cycle program. The wash was followed by a rinse at 900 rpm with 12.7 g of the Softeners B to K or Control Softener A. The terry towels were then line dried for 24 hours before being evaluated.

The intensity of the perception of the perfume on the dry towels treated with Softeners B to K and Control Softener A was evaluated by a panel of 20 trained panellists. They were asked to rub the towels in their hands and then to rate the intensity of the perfume perception on a scale ranging from 1 to 7, wherein 1 means no odour and 7 means very strong odour. The results are summarized in the following table.

TABLE 9

Olfactive performance of Capsules B to K versus Control softener A both fresh and after storage for one month at 43° C.

| | Olfactive performance | | |
|---|---|---|---|
| Fabric softener | Fresh | After 2 weeks at 43° C. | After 4 weeks at 43° C. |
| Control Softener A | 7 | 2.4 | 1.5 |
| Softener B | 7 | 3.4 | 1.8 |
| Softener C | 7 | 5.9 | 3.7 |
| Softener D | 7 | 6.8 | 6.5 |
| Softener E | 7 | 7 | 6.6 |
| Softener F | 7 | 5.1 | 2.6 |
| Softener G | 6.8 | 6.0 | 4.8 |
| Softener H | 6.6 | 6.1 | 5.6 |
| Softener I | 7 | 6 | 2.2 |
| Softener J | 6.4 | 6.2 | 6 |
| Softener K | 6.3 | 6 | 5.5 |

These results make it clear that, after storage of the fabric softener, the intensity of the perfume's odor was perceived stronger on the fabric treated with a softener of the present invention than with the control softener. This demonstrates that the persistence of the olfactive performance of the capsules over time when the fabric softener is stored is better when a polyisocyanate is added to the perfume before the aminoplast capsules formation than when the capsules are made without isocyanate.

Example 7

Preparation of a Concentrated Liquid Detergent of the Invention

Detergents D and E were prepared by adding Capsules D and E at 0.4% by weight, relative to the total weight of the detergent, into the commercially available concentrated liquid detergent base Persil® 3X Small and Mighty (trademark of Unilever, UK). This base (pH ~8) contains 5% to 15% of nonionic surfactants (such as alcohol ethoxylates) and anionic surfactants (such as sodium alkylbenzene sulphonate and sodium alkyl ether sulphate), with also less than 5% fatty soap.

Preparation of a Concentrated Liquid Detergent Comprising Control Capsules A

Control Detergent A was prepared by adding Control Capsules A at 0.40% by weight, relative to the total weight of the detergent into the commercially available concentrated liquid detergent Persil® Small and Mighty (trademark of Unilever, UK).

Stability of the Aminoplast Microcapsules in the Concentrated Liquid Detergent of the Invention The storage stability of the capsules in Detergents D and E and in Control Detergent A was evaluated. The detergents comprising the capsules were stored during up to four weeks at 43° C. or 2 weeks at 50° C. and the amount of perfume having leaked out of the capsules was measured by solvent extraction and GC-MS analysis. The results are summarized in the following table.

TABLE 10

Storage stability of the capsules in Detergents D and E and in Control Detergent A

| | Amount of perfume that leaked out of the capsules [%] | | |
|---|---|---|---|
| Detergent | After 2 weeks at 43° C. | After 4 weeks at 43° C. | After 2 weeks at 50° C. |
| Control Detergent A | 54 | 76 | 91 |
| Detergent D | 14 | 32 | 55 |
| Detergent E | 12 | 30 | 50 |

It is apparent from these results that both Capsules D and E were more stable in the concentrated liquid detergent base than the corresponding Control Capsules A, in which no polyisocyanate was used, thus showing that adding a polyisocyanate to the perfume before the encapsulation takes place improves the storage stability of the aminoplast microcapsules in a concentrated liquid detergent base.

Olfactive Performance of Aminoplast Microcapsules in a Concentrated Liquid Detergent of the Invention The olfactive performance of Capsules D and E and of Control Capsules A was then evaluated in Detergents D and E and in Control Detergent A, both fresh and after four weeks storage at 43° C.

Fabrics (2.5 kg of cotton terry towels) were washed at 40° C. in a standard European horizontal axis machine. There were dispensed 80 g of freshly prepared detergent at the start of the wash through the detergent drawer. After the wash, fabrics were line-dried and the odor intensity of the cotton towels was evaluated by a panel of 20 trained panelists, after 1 day drying. The panelists were asked to rate the odor intensity of the towels after gentle rubbing of the fabrics by hand on a scale from 1 to 7, 1 corresponding to odorless and 7 corresponding to a very strong odor. The results are shown in Table 11.

TABLE 11

Olfactive performance of Capsules D and E and of Control Capsules A in concentrated liquid detergent

| | Olfactive performance | |
|---|---|---|
| Detergent | Fresh | After 4 weeks at 43° C. |
| Control Detergent A | 6 | 2.9 |
| Detergent D | 6 | 4.6 |
| Detergent E | 6 | 4.8 |

It is clear from these results that after storage of the detergent, the perfume intensity was more intense on fabrics washed with the Detergents D and E, than on fabrics washed with the Control Detergent A. This demonstrates that the persistence of the olfactive performance of the capsules over time when the detergent is stored is better when the perfume is mixed with a polyisocyanate before the encapsulation takes place than when the capsules are made without it.

Example 8

Stability of the Aminoplast Microcapsules in the Fabric Softener of the Invention The storage stability of the control capsules A and of the invention's capsules D and E, and of capsules according to WO2004/016234, was evaluated in Control Softener A and in Softeners D to E and from the softener WO2004 respectively. The softeners were stored for two weeks at 40° C. & 45° C. The amount of perfume having leaked out of the capsules was then measured by solvent extraction and GC-MS analysis. The results are summarized in the following table.

Capsules according to WO2004/016234 were obtained by repeating the examples 1 and 3 of said document, using PVP instated of Takenate® D-110 N and in quantities according to WO2004/016234.

In other words the capsules according to WO2004/016234 where made using the following amounts with the same experimental procedure of Example 1:

TABLE 12

Composition of capsules according to WO2004/016234 Examples 1 and 3

| Ingredient | Example 1 WO2004 | Example 3 WO2004 Amount [%] |
|---|---|---|
| Oil Phase | 30.9 | 30.9 |
| Perfume oil | 27.2 | 27.2 |
| 10% w/w PVP solution in isopropanol | 3.7 | 0 |
| 10% w/w PVP solution in isopropanol with 0.3% w/w toluene diisocyanate | 0 | 3.7 |
| Water phase | | |
| acrylamide and acrylic acid copolymer[1] | 4.7 | 4.7 |
| Melamine-formaldehyde resin[2] | 4.7 | 4.7 |
| Water | 48.3 | 48.3 |
| Sodium hydroxyde | 0.5 | 0.5 |
| Acetic acid | 0.2 | 0.2 |
| Salcare SC60[3] | 10.7 | 10.7 |
| Total | 100.0 | 100.0 |

Capsules (D & E) were prepared according to the protocol from Example 1, except that the amounts of Takenate® D-110N and perfume varied as indicated in the table 3.

TABLE 13

Storage stability of the capsules in Softeners D to E and from the WO2004/016234 and in Control Softener A

| | Stored at 40° C. | | Stored at 45° C. | |
|---|---|---|---|---|
| % Perfume leakage from fabric softener | After 3 days at 40° C. | After 2 weeks at 40° C. | After 3 days at 45° C. | After 2 weeks at 45° C. |
| Control Softener A | 2 | 10 | 10 | 37 |
| WO 2004/016234 Example 1 | 15 | 24 | 24 | 55 |
| WO 2004/016234 Example 3 | 30 | 35 | 35 | 57 |
| Softener D | 0.1 | 2 | 2 | 12 |
| Softener E | 0 | 1 | 1 | 10 |

It is apparent from these results that the two capsules WO 2004/016234 Examples 1 & 3 are less stable in the softener base than the corresponding Control Capsules A, itself less stable than the Capsules D & E of the present invention since more perfume leaked out of the capsules after the storage period. This shows that the formation of a second layer or shell (two shells systems) of PvP (WO 2004/016234 Example 1 or 3) is detrimental to the stability even if a crosslinking agent such as toluene diisocyanate is added (WO 2004/016234 Example 3). In fact a second layer is not helping solve the problem of storage stability of the capsules in fabric-softener, to the contrary, it makes perfume leakage worse. This is in sharp contrast with the present invention which clearly helps reduce perfume leakage.

Olfactive Performance of the Aminoplast Microcapsules in the Fabric Softener of the Invention The olfactive performance of Control Capsules A and of Capsules D to E and from the WO2004/016234 capsules' was evaluated in Control Softener A and in Softeners D to E, both fresh and after storage for up to 2 weeks at 40° C.

Cotton terry towels (20 pieces, 18 cm*18 cm, about 30 g each) were washed with 30 g of unperfumed detergent in a washing machine (Miele Novotronic W300-33CH) at 40° C. using the short cycle program. The wash was followed by a rinse at 900 rpm with 12.7 g of the Softeners D to E or Control Softener A. The terry towels were then line dried for 24 hours before being evaluated.

The intensity of the perception of the perfume on the dry towels treated with Softeners D to E and from the WO2004/016234 and Control Softener A was evaluated by a panel of 20 trained panellists. They were asked to rub the towels in their hands and then to rate the intensity of the perfume perception on a scale ranging from 1 to 7, wherein 1 means no odour and 7 means very strong odour. The results are summarized in the following table.

TABLE 14

Olfactive performance of Capsules D to E and from the WO2004/016234 versus Control softener A both fresh and after storage for 2 weeks at 40° C.

| | Olfactive performance | |
|---|---|---|
| Fabric softener | Fresh | After 2 weeks at 40° C. |
| Control Softener A | 7 | 5.2 |
| WO 2004/016234 Example 1 | 4.7 | 4 |
| WO 2004/016234 Example 3 | 3.7 | 2.4 |
| Softener D | 7 | 6.3 |
| Softener E | 7 | 6.7 |

On fresh samples, formation of a second additional layer or shell (two shells systems) of PvP (WO 2004/016234 Example 1) or PvP with toluene diisocyanate (WO 2004/016234 Example 3) lead to a loss of olfactive performance of the capsules versus Control Softener A, to the contrary of what is obtained with Softener D & E (which are as performing Control Softener A).

After storage for 2 weeks at 40° C., the intensity of the perfume's odor was perceived stronger on the fabric treated with a softener of the present invention (D & E) than with the control softener A or the two examples from WO2004/016234.

What is claimed is:

1. A process for preparing a one-shell aminoplast core-shell microcapsule that can withstand contact with a liquid aqueous consumer product containing between 2 and 65% by weight, relative to the total weight of the consumer product, of a cationic, anionic, non-ionic, zwitterionic or semi-polar nonionic surfactant, with the process comprising the steps of:

1) admixing a perfume oil with at least a polyisocyanate having at least two isocyanate functional groups to form an oil phase;
2) dissolving into water a water-soluble aminoplast resin, optionally with a stabilizer, to form a water phase that contains dissolved aminoplast resin;
3) preparing an oil-in-water dispersion, wherein the mean droplet size is comprised between 1 and 100 µm, by admixing the oil phase and the water phase, wherein the perfume oil represents between about 10% and 60% w/w by weight, relative to the total weight of the dispersion;
4) performing a curing step to form the wall of said microcapsule, wherein the wall is made by the reaction between the polyisocyanate contained in the oil phase and the aminoplast resin contained in the water phase; and
5) optionally drying the final dispersion to obtain the dried core-shell microcapsule, wherein the resultant microcapsule is stable in said consumer product as evidenced by a loss of less than 60% of the initial perfume oil from the microcapsule when stored in the consumer product for a period of at least 2 to 4 weeks at 43° C.

2. The process according to claim 1, wherein said perfume oil contains less than 10% of its own weight of primary alcohols, less than 15% of its own weight of secondary alcohols and less than 20% of its own weight of tertiary alcohols.

3. The process according to claim 1, wherein said at least one polyisocyanate is a mixture of at least one aliphatic polyisocyanate and at least one aromatic polyisocyanate, the aliphatic polyisocyanate and the aromatic polyisocyanate being in a respective molar ratio ranging from 80:20 to 10:90.

4. The process according to claim 1, wherein said at least one polyisocyanate is an aromatic polyisocyanate.

5. The process according to claim 1, wherein said at least one polyisocyanate is added in an amount comprised between 0.01% and 20%, the percentage being w/w by weight, relative to the total weight of the perfume oil and wherein the perfume oil represents between about 25 and 45% w/w by weight, relative to the total weight of the dispersion.

6. The process according to claim 1, wherein said aminoplast resin is a melamine-formaldehyde or urea-formaldehyde condensate.

7. The process according to claim 1, wherein said aminoplast resin is added in an amount comprised between 0.5% and 15% w/w, by weight relative to the total weight of the dispersion as obtained after step 3).

8. A microcapsule produced by a process according to claim 1.

9. A microcapsule produced by a process according to claim 2.

10. A microcapsule produced by a process according to claim 3.

11. A microcapsule produced by a process according to claim 5.

12. A microcapsule produced by a process according to claim 6.

13. A microcapsule produced by a process according to claim 7.

14. A liquid perfumed consumer product comprising:
a) from 2 to 65% by weight, relative to the total weight of the consumer product, of at least one cationic, anionic, non-ionic, zwitterionic or semi-polar nonionic surfactant;
b) water; and
c) the microcapsule of claim 8.

15. A liquid perfumed consumer product comprising:
a) from 2 to 65% by weight, relative to the total weight of the consumer product, of at least one cationic, anionic, non-ionic, zwitterionic or semi-polar nonionic surfactant;
b) water; and
c) the microcapsule of claim 9.

16. A liquid perfumed consumer product comprising:
a) from 2 to 65% by weight, relative to the total weight of the consumer product, of at least one cationic, anionic, non-ionic, zwitterionic or semi-polar nonionic surfactant;
b) water; and
c) the microcapsule of claim 10.

17. A liquid perfumed consumer product comprising:
a) from 2 to 65% by weight, relative to the total weight of the consumer product, of at least one cationic, anionic, non-ionic, zwitterionic or semi-polar nonionic surfactant;
b) water; and
c) the microcapsule of claim 11.

18. A liquid perfumed consumer product comprising:
a) from 2 to 65% by weight, relative to the total weight of the consumer product, of at least one cationic, anionic, non-ionic, zwitterionic or semi-polar nonionic surfactant;
b) water; and
c) the microcapsule of claim 12.

19. A liquid perfumed consumer product comprising:
a) from 2 to 65% by weight, relative to the total weight of the consumer product, of at least one cationic, anionic, non-ionic, zwitterionic or semi-polar nonionic surfactant;
b) water; and
c) the microcapsule of claim 13.

20. A method to improve the stability of a microcapsule as defined in claim 8 comprising adding the microcapsule to a liquid consumer product comprising from 2 to 65% by weight, relative to the total weight of the consumer product, of at least one cationic, anionic, non-ionic, zwitterionic or semi-polar nonionic surfactant, wherein the microcapsules are stable in said consumer product as evidenced by a loss of less than 60% of the initial perfume oil from the microcapsules when stored in the consumer product for a period of at least 2 to 4 weeks at 43° C.

21. A process for preparing a one-shell aminoplast core-shell microcapsule that can withstand contact with a liquid aqueous consumer product containing between 2 and 65% by weight, relative to the total weight of the consumer product, of a cationic, anionic, non-ionic, zwitterionic or semi-polar nonionic surfactant, with the process comprising the steps of:

1) admixing a perfume oil with at least a polyisocyanate having at least two isocyanate functional groups to form an oil phase, wherein the perfume oil has a low alcohol content of less than 10% of its own weight of primary alcohols, less than 15% of its own weight of secondary alcohols, and less than 20% of its own weight of tertiary alcohols; and, the perfume is essentially free of solvent or if the perfume oil is dissolved in a solvent, the solvent represents less than 20% or less than 10% of the weight of the perfume;

2) dissolving into water a water-soluble aminoplast resin, optionally with a stabilizer, to form a water phase that contains dissolved aminoplast resin;

3) preparing an oil-in-water dispersion from the oil and water phases, wherein the mean droplet size is comprised between 1 and 100 by admixing the oil phase and the water phase wherein said perfume oil represents between about 20% and 60% w/w, by weight, relative to the total weight of the dispersion;

4) performing a curing step to form the wall of said microcapsule, wherein the wall is made by the reaction between the polyisocyanate contained in the oil phase and the aminoplast resin contained in the water phase; and 5) optionally drying the final dispersion to obtain the dried core-shell microcapsule; and 6) adding the microcapsule to a consumer product that include a liquid aqueous surfactant;

wherein the resultant microcapsule is stable in said consumer product as evidenced by a loss of less than 60% of the initial perfume oil from the microcapsule when stored in the consumer product for a period of at least 2 to 4 weeks at 43° C.

22. The process of claim 1 further comprising adding the microcapsule to a consumer product that includes a cationic, anionic, non-ionic, zwitterionic or semi-polar nonionic surfactant, wherein the consumer product to which the microcapsules are added comprises from 2 to 65% by weight, relative to the total weight of the consumer product, of the surfactant.

23. The process of claim 21 wherein the consumer product to which the microcapsules are added comprises from 2 to 65% by weight, relative to the total weight of the consumer product, of the surfactant.

24. A microcapsule produced by a process according to claim 21.

25. The process of claim 1 wherein the water phase comprises a stabilizer wherein said stabilizer is an ionic polymer.

26. The process of claim 1 further comprising, prior to step 5), contacting the wall of the microcapsule of step 4) with a cationic polymer.

27. The process of claim 21 wherein the water phase comprises a stabilizer wherein said stabilizer is an ionic polymer.

28. The process of claim 21 further comprising, prior to step 5), contacting the wall of the microcapsule of step 4) with a cationic polymer.

* * * * *